(12) United States Patent
Fischer

(10) Patent No.: US 7,163,254 B2
(45) Date of Patent: Jan. 16, 2007

(54) FOLDING TOP OF A CONVERTIBLE AUTOMOBILE

(75) Inventor: Jochem Fischer, Ostfildern (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 11/059,573

(22) Filed: Feb. 16, 2005

(65) Prior Publication Data

US 2005/0194812 A1    Sep. 8, 2005

(30) Foreign Application Priority Data

Mar. 3, 2004   (DE)   ...................... 10 2004 010 273

(51) Int. Cl.
*B60J 7/14*   (2006.01)
(52) U.S. Cl. .................. 296/108; 296/107.17
(58) Field of Classification Search ................ 296/108, 296/107.17, 107.01
See application file for complete search history.

(56) References Cited

U.S. PATENT DOCUMENTS

| | | | | |
|---|---|---|---|---|
| 6,126,231 A | * | 10/2000 | Suzuki et al. | .......... 296/187.05 |
| 6,149,198 A | * | 11/2000 | Klaas | .......... 280/798 |
| 6,382,703 B1 | * | 5/2002 | Queveau et al. | ........ 296/107.17 |
| 2002/0185885 A1 | * | 12/2002 | Biecker et al. | ............. 296/108 |
| 2003/0075951 A1 | * | 4/2003 | Hanakawa et al. | .......... 296/188 |
| 2003/0122400 A1 | * | 7/2003 | Berglund et al. | ......... 296/146.9 |
| 2004/0113461 A1 | * | 6/2004 | Shimizu et al. | ......... 296/193.06 |
| 2005/0194811 A1 | * | 9/2005 | Fischer | ....................... 296/108 |

FOREIGN PATENT DOCUMENTS

DE    699 04 108 T2    4/2003

OTHER PUBLICATIONS

"phi Produktionstechnik Hannover informiert", edition 2, Oct. 2000.

* cited by examiner

*Primary Examiner*—Jason Morrow
(74) *Attorney, Agent, or Firm*—Henry M. Feiereisen

(57) ABSTRACT

A convertible includes a folding top having side beams, which are articulated to one another, and a roof structure, which is connected to the side beams and made at least partially of high-strength hot-formed steel material. Hereby the roof structure may include a roof member which is made of high strength hot formed steel material, or the roof structure may include a roof member and a reinforcement member which is made of high strength hot formed steel material and extends between the side beams, for support of the roof member.

20 Claims, 2 Drawing Sheets

FOLDING TOP OF A CONVERTIBLE AUTOMOBILE

CROSS-REFERENCES TO RELATED APPLICATIONS

This application claims the priority of German Patent Application, Serial No. 10 2004 010 273.2, filed Mar. 3, 2004, pursuant to 35 U.S.C. 119(a)–(d).

BACKGROUND OF THE INVENTION

The present invention relates, in general, to a convertible type motor vehicle, and more particularly to a folding top of a convertible automobile, referred to hereinafter as "convertible".

Nothing in the following discussion of the state of the art is to be construed as an admission of prior art.

Although convertibles are typically derived of production vehicles, their body still is designed with numerous modifications to satisfy prescribed safety regulations. Despite various reinforcements, convertibles are inferior as far as safety is concerned because the absence of a hard roof and the connection to the vehicle body necessarily diminish stability and rigidity. Traditionally, convertibles have canvas tops with a foldable support structure which includes side beams that are articulated to one another and covered by a canvas. Increasingly popular is the use of folding tops having a roof member made of sheet metal. Tubes are hereby integrated or welded into those regions of the roof structure that are subject to particular stress or critical as far as strength is concerned.

It would be desirable and advantageous to provide an improved convertible having a folding top of superior stability and safety while configured of light-weight construction.

SUMMARY OF THE INVENTION

According to one aspect of the present invention, a convertible includes a folding top having side beams, which are articulated to one another, and a roof structure, which is connected to the side beams and made at least partially of high-strength hot-formed steel material.

The present invention thus resolves prior art shortcomings by the use of high-strength hot-formed steel material for the roof structure.

According to one embodiment of the present invention, the roof structure includes a roof member which is made of high-strength hot-formed steel. In this way a high degree of stability and strength can be achieved solely by the roof member of the folding top. The number of previously required reinforcing components can be significantly reduced so that, overall, the folding top of the convertible can be made of lightweight construction.

According to another feature of the present invention, the roof member may have portions of different thickness. As a consequence of a varying geometric construction of the roof member, it is possible to tailor the configuration of the roof member to respective crash demands and to best suit the deformation characteristic in order to provide optimum crash behavior and energy absorption capability in the event of a rollover.

According to another feature of the present invention, the roof member may, at least partially, be heat treated. The term "heat treated" is used here in a generic sense and refers to any tempering process, involving the heating and cooling of a steel material in the solid state to provide certain strength properties. It will also be understood by persons skilled in the art that the terms "heat treated" and "tempered" or "quenched and tempered" are used synonymous in the disclosure.

Suitably, the roof member is tempered by laser hardening. Through partial heat treatment or hardening, the roof member is provided with zones of different strength. Thus, regions of the roof member that are subject to especially high stress can be reinforced, thereby eliminating the need for typical reinforcements at those regions so that the folding top can be made lighter.

According to another embodiment of the present invention, the roof structure includes a roof member, and at least one reinforcement member which is made of high-strength hot-formed steel and extends transversely between the side beams for support of the roof member. Simulation tests have shown a significant increase in stability and rigidity of the folding top construction which in turn renders the convertible safer. The stiffness of the roof structure is realized here by the provision of the reinforcement member or members so that the roof member may be constructed lighter. Suitably, the roof member is made of paintable metal, e.g. of steel sheet, or plastic.

Depending on crash demands and realization of a tailored deformation characteristic, the reinforcement member may have portions of different thickness or may, at least partially, be heat treated.

According to another feature of the present invention, the side beams may be made in the form of hot-forming components. Suitably, the side beams are made of high strength steel which is hot formed and, optionally, at least partially heat treated and hardened. In this way, the strength and the stability of the convertible top is significantly enhanced.

According to another feature of the present invention, the side beams may be lined by coverings. Examples of coverings include plastic coverings or sheet metal coverings which are constructed to satisfy passenger safety regulations. Suitably, the inside wall surface of the roof member may further be lined with a plastic lining and/or foam lining.

The strength of the hot formed components of the roof structure of the folding top in accordance with the present invention, i.e. the roof member, or the one or more reinforcement members, or also the side beams, is suitably above 1,400 N/mm². In particular, when the folding top is closed, the overall safety for the vehicle occupants is significantly improved.

The hot formed components can be made from a starting material which is heated in a heat treatment facility to a hardening temperature, i.e. to a temperature above $Ac_3$ where steel is in an austenitic state. Typically, the temperature ranges between 775° C. and 1,000° C. Subsequently, the semi-finished product is shaped in a pressing tool and subsequently allowed to cool down for hardening. As a result, the metallic end product has a fine-grained martensitic or bainitic structure. Suitably, the metallic end product remains in the pressing tool during the hardening process.

Examples of a starting material include a steel material containing, in weight percent, 0.18% to 0.3% of carbon (C), 0.1% to 1.0% of silicon (Si), 1% to 2.5% of manganese (Mn), 0.1. % to 0.8% of chromium (Cr), 0.1% to 0.5% of molybdenum (Mo), 0.02% to 0.05% of titanium (Ti), 0.002% to 0.05% of boron (B), 0.01% to 0.06% of aluminum (Al), maximal 0.01% of sulphur (S), maximum 0.025% of phosphor, the remainder being iron (Fe) including incidental melt-based impurities.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
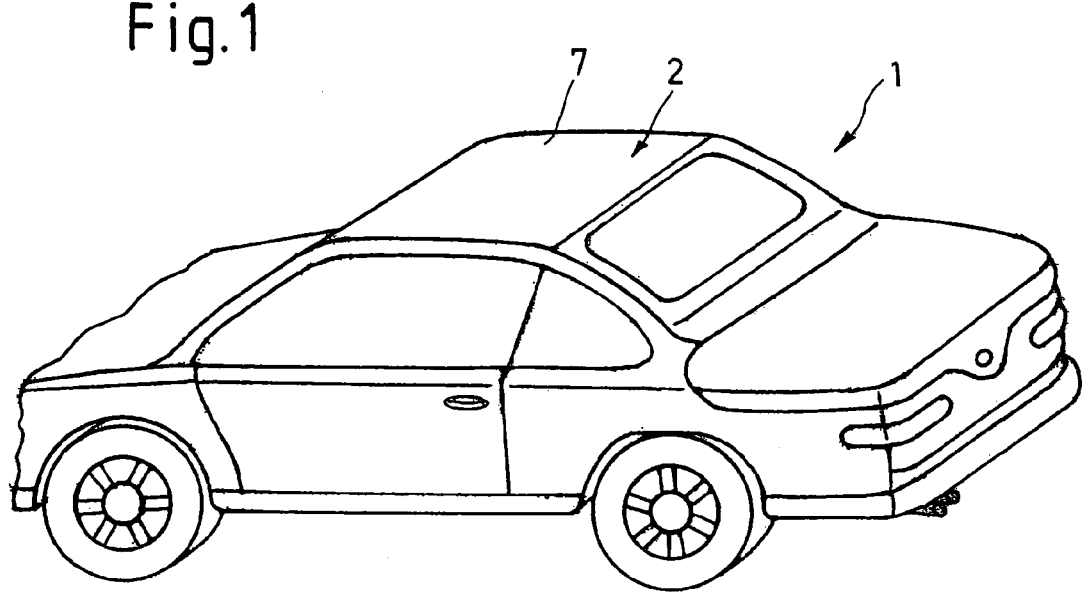
FIG. 1 is a top, side and rear perspective illustration of a convertible with a convertible folding top according to the present invention in closed state.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 2:
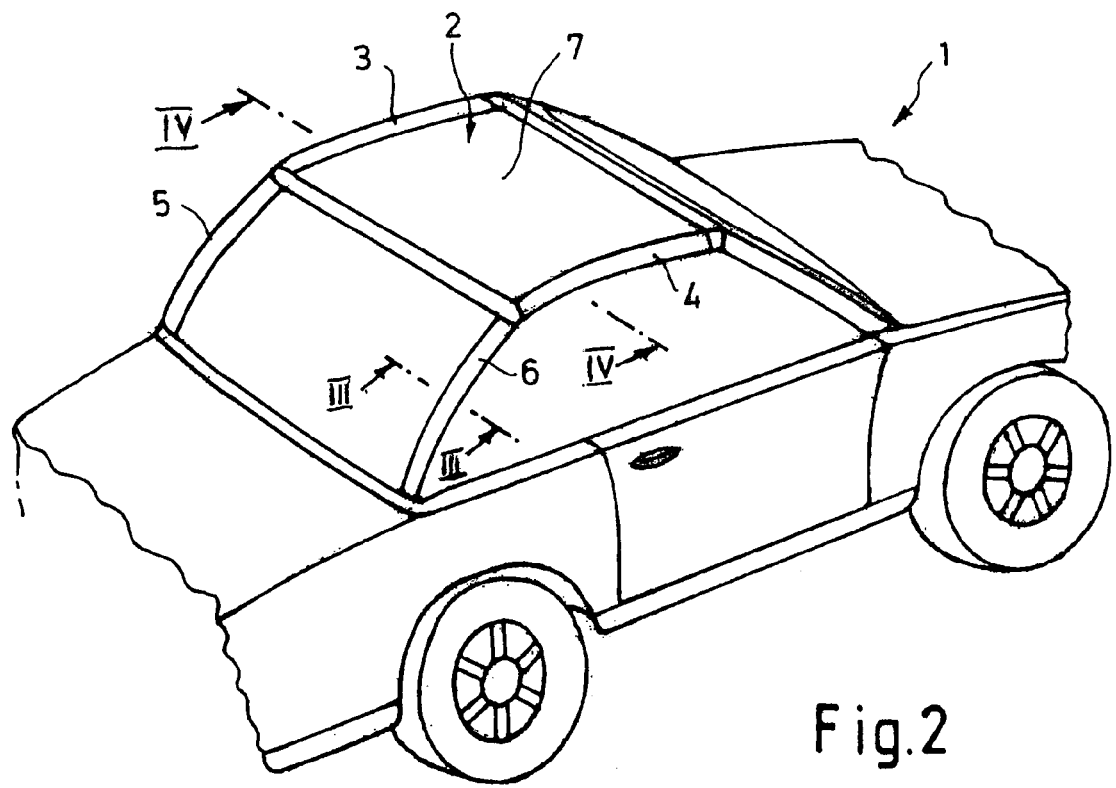
FIG. 2 is a fragmentary top and side perspective view of a midsection of another convertible with a convertible folding top according to the present invention in closed state.

Turning now to the drawing, and in particular to FIG. 1, there is shown a basic configuration, by way of a top, side and rear perspective illustration of a convertible, generally designated by reference numeral 1 and including a convertible folding top according to the present invention, generally designated by reference numeral 2. As depicted in FIG. 2, which is a fragmentary top and side perspective view of a midsection of a convertible, the folding top 2 includes side beams 3, 4 and 5, 6, which are articulated to one another, and a roof member 7, which extends between the side beams 3, 4 and 5, 6.

The side beams 3, 4, 5, 6 are hot formed products made of high or highest strength steel. An example of a suitable steel material contains, in weight percent, 0.18% to 0.3% of carbon (C), 0.1% to 1.0% of silicon (Si), 1% to 2.5% of manganese (Mn), 0.1. % to 0.8% of chromium (Cr), 0.1% to 0.5% of molybdenum (Mo), 0.02% to 0.05% of titanium (Ti), 0.002% to 0.05% of boron (B), 0.01% to 0.06% of aluminum (Al), maximal 0.01% of sulphur (S), maximum 0.025% of phosphor, the remainder being iron (Fe) including incidental melt-based impurities. In order to impart the side beams 3, 4, 5, 6 with a vehicle-specific deformation characteristic, partial heat treatment may be applied.

Figure 3:
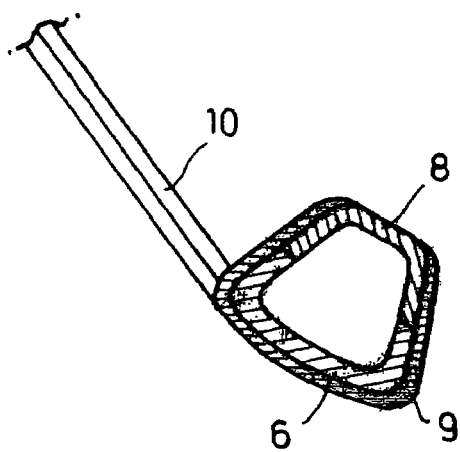
FIG. 3 is a sectional view of the convertible along the line III—III in FIG. 2.

As shown in FIG. 3 which is a sectional view taken along the line III—III in FIG. 2, it can be seen that the side beam 6 is partially ensheathed by an inner covering 8 and an outer covering 9 which may be made of plastic or sheet metal. Reference numeral 10 designates a rear or side window. Of course, the other side beams 3, 4, 5 are constructed in a same manner as the side beam 6 and ensheathed by inner and outer coverings 8, 9.

Figure 4:
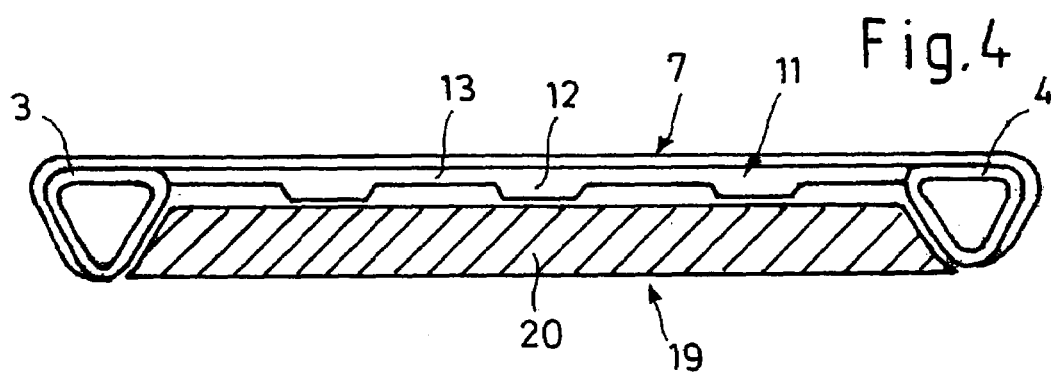
FIG. 4 is a sectional view of the convertible top along the line IV—IV in FIG. 2.

FIG. 4 shows a sectional view of the convertible top along the line IV—IV in FIG. 2. The side beams 3, 4 and the roof member 7 forming the outer end can be recognized here. The roof member 7 is made of paintable metal of plastic and so constructed as to laterally cover the side beams 3, 4 in form-fitting manner. Extending between the side beams 3, 4 is a reinforcement member 11 which is made of high strength hot formed steel, e.g., a steel of a composition as described above in connection with the side beams. The reinforcement member 11 supports the roof member 7 and imparts to the folding top 2 the required vehicle-specific rigidity and stability.

The reinforcement member 11 has portions 12, 13 of different thickness and may be partially heat treated to exhibit regions of different strength. In this way, the reinforcement member 11 can be provided with a predetermined crash behavior. This assists in the absorption of acceleration peaks in the event of a rollover of the vehicle and to evenly distribute the strain for an occupant at a lower level over a longer period.

Figure 5:
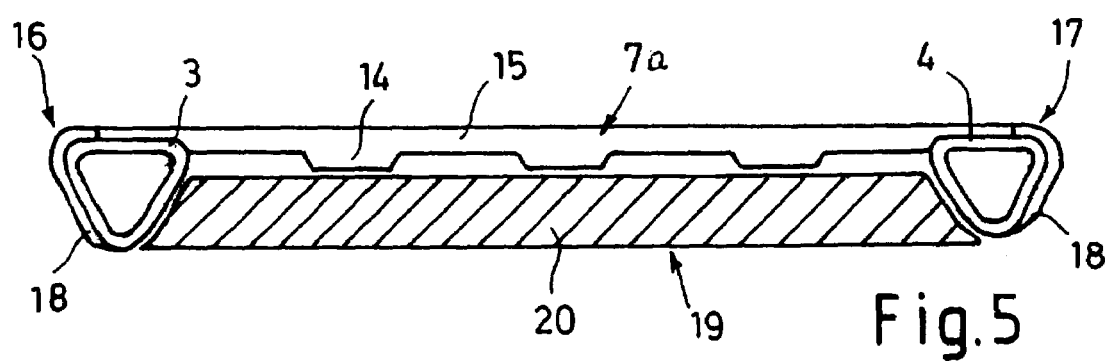
FIG. 5 is a sectional view of a modified folding top.

FIG. 5 shows a modification of a folding top 2 having a roof member 7a which by itself is made of high strength hot formed steel, e.g., a steel of a composition as described above in connection with the side beams. The roof member 7a has portions 14, 15 of different thickness. In areas that are exposed to high stress, the roof member 7a may be partially heat treated. Thus, the roof member 7a can have a tailored deformation characteristic to enhance safety for an occupant.

As further shown in FIG. 5, the side beams has length portions 16, 17 which are lined by a covering 18.

In both embodiments shown in FIGS. 4 and 5, the folding top 2 is provided on its inner side 19 facing the passenger compartment with a lining 20 of foam or plastic.

It will be understood by persons skilled in the art that the type of plastic or foam as referred to in the foregoing description is generally known to the artisan and can be selected from a wide variety so that specific example have been omitted for the sake of simplicity.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A convertible, comprising a folding top having side beams, which are articulated to one another, and a roof structure, which is connected to the side beams and made at least partially of hot-formed high-strength steel material, wherein the roof structure includes a roof member, and at least one reinforcement member made of hot-formed high-strength steel and extending transversely between the side beams for support of the roof member.

2. A convertible, comprising a folding top having side beams which are articulated to one another to define a four-sided area, and a roof member sized to span the area defined by the side beams and made entirely of hot-formed high-strength steel material.

3. The convertible of claim 2, wherein the roof member has portions of different thickness.

4. The convertible of claim 2, wherein the roof member is at least partially heat treated.

5. The convertible of claim 2, wherein the roof member is laser hardened.

6. The convertible of claim 1, wherein the reinforcement member has portions of different thickness.

7. The convertible of claim 1, wherein the reinforcement member is at least partially heat treated.

8. The convertible of claim 1, wherein the roof member is made of paintable metal or plastic.

9. The convertible of claim 1, wherein the roof member is made of sheet steel.

10. The convertible of claim 2, wherein the side beams are made by a hot-forming process.

11. The convertible of claim 2, wherein the side beams are at least partially heat treated.

12. The convertible of claim 2, and further comprising a covering for lining the side beams.

13. The convertible of claim 12, wherein the covering is made of plastic.

14. The convertible of claim 12, wherein the covering is made of sheet metal.

15. The convertible of claim 2, wherein the roof member has an inside wall surface lined with a plastic lining and/or foam lining.

16. The convertible of claim 2, wherein the steel material has a tensile strength of above 1,400 N/mm$^2$.

17. The convertible of claim 2, wherein the steel material contains, in weight percent, 0.18% to 0.3% of carbon (C), 0.1% to 1.0% of silicon (Si), 1% to 2.5% of manganese (Mn), 0.1% to 0.8% of chromium (Cr), 0.1% to 0.5% of molybdenum (Mo), 0.02% to 0.05% of titanium (Ti), 0.002% to 0.05% of boron (B), 0.01% to 0.06 of aluminum (Al), maximal 0.01% of sulphur (S), maximum 0.025% of phosphor, the remainder being iron (Fe) including incidental melt-based impurities.

18. The convertible of claim 1, wherein the side beams are made by a hot-forming process.

19. The convertible of claim 1, wherein the side beams are at least partially heat treated.

20. The convertible of claim 1, and further comprising a covering for lining the side beams.

* * * * *

UNITED STATES PATENT AND TRADEMARK OFFICE
CERTIFICATE OF CORRECTION

| | | |
|---|---|---|
| PATENT NO. | : 7,163,254 B2 | Page 1 of 1 |
| APPLICATION NO. | : 11/059573 | |
| DATED | : January 16, 2007 | |
| INVENTOR(S) | : Jochem Fischer | |

It is certified that error appears in the above-identified patent and that said Letters Patent is hereby corrected as shown below:

Column 4, line 2: Replace "..of plastic" with --or plastic--.

Signed and Sealed this

Twenty-fourth Day of April, 2007

JON W. DUDAS
*Director of the United States Patent and Trademark Office*